Patented Dec. 5, 1939

2,182,509

UNITED STATES PATENT OFFICE

2,182,509

PRODUCTION OF DOUBLE FLUORIDES OF ALKALI METALS AND ALUMINUM

Harold W. Heiser, East St. Louis, Ill., assignor to Aluminum Company of America, Pittsburgh, Pa., a corporation of Pennsylvania No Drawing. Application May 24, 1937, Serial No. 144,413

10 Claims. (Cl. 23—88)

This invention relates to the production of double fluorides of alkali metals and aluminum, and it is particularly concerned with the production of double fluorides of sodium and aluminum. The double fluorides of the alkali metals and aluminum have found more or less extensive commercial application, particularly in the manufacture of aluminum from its ores. The double fluorides of these alkali metals and aluminum, particularly sodium and aluminum, occur rather sparingly in nature as the minerals cryolite, having the formula $3NaF.AlF_3$, and chiolite, having the reported formula $5NaF.3AlF_3$. Various methods have been developed for the production of the pure compounds from the ores, but in most cases the cryolite or chiolite produced contains substantial amounts of various impurities, particularly silica.

It is an object of the present invention to provide an improved method for the production of double fluorides of alkali metals and aluminum. Another object of this invention is to provide an improved method for the production of sodium aluminum fluoride compounds. It is more particularly an object of my invention to provide a method for the production of sodium aluminum fluoride substantially free from silica.

In my copending application, Serial No. 144,412, filed May 24, 1937, I have described a method for the production of hydrofluoboric acid compounds, by which term is meant hydrofluoboric acid and the fluoborate salts, from fluorspar ores, in which fluorspar is digested with an aqueous solution of sulfuric acid containing a boric acid compound. By this method, I have found that I can obtain substantially complete recovery of the fluorine content of fluorspar ores in the form of a soluble compound, at relatively low temperatures, without the intermediate formation of any fluorine-containing gases. Furthermore, I have found that a solution of a hydrofluoboric acid compound which is substantially free from silica may be produced by this method even though low grade fluorspar containing a relatively high percentage of silica is used as the starting material.

I have discovered that by treatment of a solution of a hydrofluoboric acid compound such, for example, as is obtained by the process of my copending application above referred to, with an alkali aluminate solution in the presence of another soluble alkali metal compound, a double fluoride of an alkali metal and aluminum can be produced. Thus, I have found, for example, that by treatment of a hydrofluoboric acid solution with sodium aluminate and caustic soda, a sodium aluminum fluoride of substantially the composition of cryolite may be produced according to the equation:

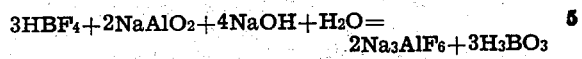

$3HBF_4 + 2NaAlO_2 + 4NaOH + H_2O = 2Na_3AlF_6 + 3H_3BO_3$

While my invention is applicable to the production of double fluorides of aluminum and various alkali metals, it will be more particularly described in connection with the preferred form of the invention in which the double fluorides of sodium and aluminum are produced. I do not intend, therefore, that my invention shall be limited to or circumscribed by the specific details of operation hereinafter set forth, except as they are recited in the appended claims. The term sodium aluminum fluoride as used herein and in the appended claims is intended to include cryolite and chiolite, as well as double fluorides of sodium and aluminum in which the ratios of sodium fluoride to aluminum fluoride differ from their ratios in cryolite and chiolite.

In producing sodium aluminum fluorides according to my invention, a solution of a hydrofluoboric acid compound is first prepared in any suitable manner such as by simply dissolving the desired compound in water, or by synthesizing the desired compound in solution; for example, as is described in my copending application for patent above referred to. In this latter case, fluorspar is digested with an aqueous solution of sulfuric acid containing boric acid or a compound capable of forming boric acid in solution. The sulfuric acid solution is preferably a 10 to 20 per cent solution used in sufficient amount to supply the theoretical quantity or somewhat less than the theoretical quantity of sulfuric acid required to decompose all of the calcium fluoride present. The boric acid compound is preferably present in amount somewhat in excess of the amount required to combine with all of the fluorine in the calcium fluoride to form a hydrofluoboric acid compound. The digestion is preferably carried out for a period of 1 to 3 hours at a temperature of about 70 to 100° C. to effect substantially complete reaction. The digestion may be carried out in one or more stages as desired. After completion of the digestion, the liquor containing the hydrofluoboric acid compound is cooled and filtered off from the calcium sulfate sludge. The solution thus formed may be treated directly with sodium aluminate and another sodium compound according to the method of the present invention, to produce cryolite. Thus, by the method of my invention, cryolite may be produced directly from fluorspar.

The solution of hydrofluoboric acid compound is mixed with a solution of sodium aluminate and another sodium compound. The sodium aluminate solution may be of any desired concentration, and I have found that a solution containing about 80 to 100 grams per liter of alumina is preferred. The sodium aluminate solution is preferably used in an amount sufficient to supply the stoichiometrical quantity of alumina required to form cryolite with the fluorine of the solution of the hydrofluoboric acid compound. The additional sodium compound should preferably be used in an amount sufficient to bring the sodium content of the mixture up to an amount equivalent to about 3 atoms of sodium to each atom of aluminum. For this purpose, I prefer to use sodium hydroxide or sodium carbonate, but other sodium salts, such as the sulfate, may be used if desired. While the reaction will proceed at ordinary temperatures, it is generally preferred to heat the mixture at a temperature of between 50 and 100° C. The reaction is continued until precipitation of sodium aluminum fluoride is substantially complete. The precipitated sodium aluminum fluoride is then filtered off and washed. The filtrate containing the boric acid or boric acid compound may be used in the digestion of further quantities of fluorspar for the production of the solution of the hydrofluoboric acid compound if desired, in conjunction with additional amounts of sulfuric acid.

Alternatively, the sodium aluminum fluoride may be prepared from a solution of a hydrofluoboric acid compound by a two-step process in which the hydrofluoboric acid compound is first treated with the sodium hydroxide or sodium carbonate to form a solution of sodium fluoride and borax. If desired, the sodium fluoride may be separated from this solution by fractional crystallization and then dissolved to form a substantially pure sodium fluoride solution, or the solution may be used directly in the subsequent steps of the process. The sodium fluoride solution is treated with the solution of sodium aluminate and an acid to precipate the sodium aluminum fluoride. The sodium aluminate solution is preferably used in amounts sufficient to supply the stoichiometrical quantities of alumina necessary to form sodium aluminum fluoride with all of the fluorine present in the solution. The acid is preferably added in the form of carbon dioxide gas. The carbon dioxide is added until precipitation of the sodium aluminum fluoride is substantially complete. The reaction is preferably carried out at a temperature of 50 to 100° C. When the precipitation is complete, the sodium aluminum fluoride is filtered off and washed.

The following specific example will serve to illustrate the particular form of the method of my invention, in which a solution of hydrofluoboric acid compound is formed from fluorspar, and this solution is treated with sodium aluminate and a sodium compound to produce sodium aluminum fluoride. One hundred and fifty grams of fluorspar containing about 86 per cent $CaF_2$ and about 12 per cent silica were stirred with 500 cubic centimeters of an aqueous solution containing 125 grams of sulfuric acid and 75 grams of borax. The mixture was stirred for about one hour at a temperature of 80° C. and filtered to separate the solution of the hydrofluoboric acid compound from the hydrated calcium sulfate precipitate. After the filtrate was cooled and clarified a 100 cc. portion was diluted with an equal volume of water and heated to about 95° C. To this hot solution there was then added 85 cc. of a solution of sodium aluminate containing 50 grams per liter of $Al_2O_3$ and 77 grams per liter of NaOH. A grainy form of sodium aluminum fluoride formed almost as rapidly as the sodium aluminate solution was trickled into the hot agitated solution of the hydrofluoboric acid compound. Stirring was continued for one hour. The product filtered readily, and after being washed and dried proved to be of high purity, having a fluorine content equivalent to about 95 per cent cryolite.

I claim:

1. A method for the production of double fluorides of alkali metals and aluminum, comprising treating a solution of a hydrofluoboric acid compound with an alkali metal aluminate and an alkali metal compound in amount sufficient to provide about 3 atoms of alkali metal to each atom of aluminum.

2. A method for the production of a sodium aluminum fluoride, comprising treating a solution of a hydrofluoboric acid compound with a solution of sodium aluminate containing another sodium compound in amount sufficient to provide about 3 atoms of sodium to each atom of aluminum.

3. A method for the production of a sodium aluminum fluoride, comprising treating a solution of a hydrofluoboric acid compound with a solution of sodium aluminate containing another sodium compound in amount sufficient to provide about 3 atoms of sodium to each atom of aluminum at a temperature of 50 to 100° centigrade.

4. A method for the production of a sodium aluminum fluoride, comprising treating a solution of a hydrofluoboric acid compound with a solution of sodium aluminate containing sodium carbonate in amount sufficient to provide about 3 atoms of sodium to each atom of aluminum at a temperature of 50 to 100° centigrade.

5. A method for the production of a sodium aluminum fluoride, comprising treating a solution of a hydrofluoboric acid compound with a solution of sodium aluminate containing caustic soda in amount sufficient to provide about 3 atoms of sodium to each atom of aluminum at a temperature of 50 to 100° centigrade.

6. A method adapted to produce double fluorides of aluminum and alkali metals substantially free from silica directly from fluorspar containing a large percentage of silica, without the evolution of fluorine or a gaseous compound thereof at any stage, comprising treating fluorspar with an aqueous solution of a strong mineral acid and a boric acid compound and producing thereby a substantially silica-free hydrofluoboric acid compound in solution and precipitating a calcium salt, removing the latter, treating the hydrofluoboric acid containing solution with an alkali metal aluminate and another alkali metal compound in amount sufficient to provide about 3 atoms of alkali metal to each atom of aluminum and precipitating a substantially silica-free double fluoride of aluminum and the alkali metal and producing a boric acid compound in solution, and separating the double fluoride precipitate from the solution of the boric acid compound.

7. A method adapted to produce double fluorides of aluminum and alkali metals substantially free from silica directly from fluorspar containing a large percentage of silica, without the evolution of fluorine or a gaseous compound thereof at any stage, comprising digesting fluorspar with an aqueous solution of sulfuric acid containing a boric acid compound and producing thereby a substantially silica-free hydrofluoboric acid compound in solution and precipitating calcium sulfate, removing the latter, treating the hydrofluoboric acid containing solution with an alkali metal aluminate and another alkali metal compound in amount sufficient to provide about 3 atoms of alkali metal to each atom of aluminum and precipitating a substantially silicia-free double fluoride of aluminum and the alkali metal and producing a boric acid compound in solution, and separating the double fluoride precipitate from the solution of the boric acid compound.

8. A method adapted to produce a double fluoride of aluminum and sodium substantially free from silica directly from flourspar containing a large percentage of silica, without the evolution of fluorine or a gaseous compound thereof at any stage, comprising digesting fluorspar with an aqueous solution of a strong mineral acid and a boric acid compound and producing thereby a substantially silica-free hydrofluoboric acid compound in solution and precipitating a calcium salt, removing the latter, treating the hydrofluoboric acid compound in solution with aluminum trihydrate and a sodium compound in amount sufficient to provide about 3 atoms of sodium to each atom of aluminum and precipitating a substantially silica-free double fluoride of aluminum and sodium and producing a boric acid compound in solution, and separating the double fluoride precipitate from the solution of the boric acid compound.

9. A method adapted to produce a double fluoride of aluminum and sodium substantially free from silica directly from fluorspar containing a large percentage of silica, without the evolution of fluorine or a gaseous compound thereof at any stage, comprising digesting fluorspar with an aqueous solution of sulfuric acid containing a boric acid compound and producing thereby a substantially silica-free hydrofluoboric acid compound in solution and precipitating calcium sulfate, removing the latter, treating the hydrofluoboric acid compound in solution with aluminum trihydrate and a sodium compound in amount sufficient to provide about 3 atoms of sodium to each atom of aluminum and precipitating a substantially silica-free double fluoride of aluminum and sodium and producing a boric acid compound in solution, and separating the double fluoride precipitate from the solution of the boric acid compound.

10. A method adapted to produce double fluorides of aluminum and alkali metals substantially free from silica directly from fluorspar containing a large percentage of silica, without the evolution of fluorine or a gaseous compound thereof at any stage, comprising treating fluorspar with an aqueous solution of a strong mineral acid and a boric acid compound and producing thereby a substantially silica-free hydrofluoboric acid compound in solution and precipitating a calcium salt, removing the latter, treating the hydrofluoboric acid containing solution with an alkali metal compound to form an alkali metal fluorine compound in solution, separating the alkali metal flourine compound, treating the alkali metal fluorine compound in solution with an alkali metal aluminate and an acid to precipitate a substantially silica-free double fluoride of the alkali metal and aluminum, and separating the double fluoride precipitate from the solution.

HAROLD W. HEISER.